United States Patent
Syngaevskiy

(10) Patent No.: US 10,103,622 B2
(45) Date of Patent: Oct. 16, 2018

(54) SWITCHING MODULE

(71) Applicant: Vasily Alekseyevich Syngaevskiy, Moscow (RU)

(72) Inventor: Vasily Alekseyevich Syngaevskiy, Moscow (RU)

(73) Assignee: NXP USA, Inc., Austin, TX (US)

( * ) Notice: Subject to any disclaimer, the term of this patent is extended or adjusted under 35 U.S.C. 154(b) by 569 days.

(21) Appl. No.: 14/458,925

(22) Filed: Aug. 13, 2014

(65) Prior Publication Data
US 2015/0229213 A1 Aug. 13, 2015

(30) Foreign Application Priority Data

Feb. 13, 2014 (RU) .................................. 2014105116

(51) Int. Cl.
*H02M 3/158* (2006.01)
*H02M 3/155* (2006.01)
*H02M 1/00* (2006.01)

(52) U.S. Cl.
CPC ............ *H02M 3/155* (2013.01); *H02M 3/158* (2013.01); *H02M 2001/0009* (2013.01)

(58) Field of Classification Search
CPC ................. H02M 3/155; H02M 3/158; H02M 2001/0009

USPC ......................................................... 323/271
See application file for complete search history.

(56) References Cited

U.S. PATENT DOCUMENTS

| | | | |
|---|---|---|---|
| 6,300,818 B1 * | 10/2001 | Mao ...................... | H02M 3/156 323/907 |
| 7,102,337 B2 * | 9/2006 | Wheeler ............. | H02M 3/1588 323/224 |
| 7,852,148 B2 | 12/2010 | Massie et al. | |
| 2013/0057241 A1 * | 3/2013 | Shuvalov ............. | H03K 17/122 323/271 |

* cited by examiner

*Primary Examiner* — Harry Behm
*Assistant Examiner* — Lorena Bruner
(74) *Attorney, Agent, or Firm* — Charlene R. Jacobsen

(57) ABSTRACT

A switching module comprising at least one power switching device arranged to output from an output node thereof a load current for the switching module, and at least one current sense component arranged to generate at least one sense current representative of the load current. The at least one current sense component comprises at least one temperature coefficient compensation resistance within the path of the at least one sense current and arranged to cause the at least one sense current to be at least partly compensated for a temperature coefficient caused by at least one parasitic routing resistance of a load current path for the at least one power switching device.

18 Claims, 5 Drawing Sheets

SWITCHING MODULE

FIELD OF THE INVENTION

This invention relates to a switching module, and in particular to a switching module comprising at least one power switching device arranged to output from an output node thereof a load current for the switching module, and at least one current sense component arranged to generate at least one sense current representative of the load current

BACKGROUND OF THE INVENTION

FIG. 1 illustrates a simplified circuit diagram of an example of a smart power switching module 100 for use within, for example, an alternator regulator. The smart power switching module 100 comprises a power switching device (Field Effect Transistor—FET) 110 operably coupled between a battery/alternator supply 102 and an output 104 of the power switching module 100. The power switching device 110 is controllable via a gate signal 114 to allow a load current (I_LOAD) 112 to flow there through, from the battery/alternator supply 102 to the output 104 of the power switching module 100.

The power switching module 100 further comprises a current sense component for the load current (I_LOAD) 112. The current sense component comprises a differential or error amplifier 130 comprising a first (inverting) input operably coupled to a source node 115 of the power switching device 110. In this manner, the first (inverse) input of the differential amplifier 130 is arranged to receive a voltage signal representative of the voltage level of the battery/alternator supply 102 less the potential difference across the power switching device 110.

The differential amplifier 130 further comprises a second (non-inverting) input arranged to receive a current sense feedback signal generated by a current sense feedback component of the current sense component. The current sense feedback component comprises a sense switching device (FET) 120 operably coupled between the battery/alternator supply 102 and a ground plane 106. The sense switching device 120 is controllable by the same gate signal 114 as the power switching device 110. In this manner, the current flow through the sense switching device 120 is representative of the current flow through the power switching device 110. A source node 125 of the sense switching device 120 is operably coupled to the second (non-inverting) input of the differential amplifier 130. In this manner, the second (non-inverting) input of the differential amplifier 130 is arranged to receive a voltage signal representative of the voltage level of the battery/alternator supply 102 less the potential difference across the sense switching device 120.

A feedback transistor 140 is operably coupled between the source node 125 of the sense switching device 120 and the ground plane 106. A gate of the feedback transistor 140 is operably coupled to a (positive) output of the differential amplifier 130. In this manner, the sense switching device 120 and the feedback transistor 140 are operably coupled in series, with the sense switching device 120 being controllable via the gate signal 114 and the feedback transistor 140 being controllable via the output of the differential amplifier 130. The differential amplifier 130 is arranged to control the current I_SENSE 122 through the feedback transistor 140 such that substantially equal voltage potentials are maintained at its inputs, and thus at the source nodes 115, 125 of the power switching device 110 and sense switching device 120.

Significantly, by maintaining substantially equal voltage potentials at the source nodes 115, 125 of the power switching device 110 and sense switching device 120, and because the sense switching device 120 is controlled by the same gate signal 114 as the power switching device 110, the current I_SENSE 122 is proportional to the load current (I_LOAD) 112. The feedback transistor 140 effectively acts as a voltage to current converter, converting the voltage signal output by the differential amplifier 130 into the current I_SENSE 122. As such, the voltage signal output by the differential amplifier 130 may be considered as being representative of the load current (I_LOAD) 112.

The output of the error amplifier 130 is further provided to a gate of a voltage-to-current converter transistor 150, which converts the output signal of the error amplifier 130 into a sense current I_SNS 160 representative of the current I_SENSE 122. The sense current I_SNS 160 is sourced from an input of an analogue to digital converter (ADC) 170. The ADC 170 also receives a reference current 165 and outputs a digital code 175 based on an integer representative of the ratio of the sense current I_SNS 160 and the reference current 165.

The current recopy ratio between the power switching device 110 and the sense switching device 120 is primarily dependent on the ratio of the geometries of the two devices. However, parasitic metal on-resistance of the routing for the source and drain nodes of the power switching device 110 can be another significant contributing factor to the recopy ratio between the power switching device 110 and the sense switching device 120. Specifically, parasitic metal on-resistance of the routing for the source and drain nodes of the power switching device 110 affects the absolute value of the recopy ratio and also creates a significant temperature coefficient for the recopy ratio.

The next generation of alternator regulators are required to provide a digital code for the value of the load current with a 2% accuracy across all conditions. Consequently, all contributors to inaccuracy have to individually achieve an error budget much less than 2%. The current recopy ratio between the power switching device 110 and the sense switching device 120 is one such contributor. The absolute value of the recopy ratio may be trimmed out at room temperature.

However, the temperature coefficient of the recopy ratio cannot be trimmed out, and thus can be problematic when trying to achieve the <2% accuracy at temperatures other than room temperature, and in particular at extreme temperatures. The recopy ratio between a large geometry, e.g. of the order of 1 mm$^2$, power switching device 110 and a sense switching device 120 may have a temperature coefficient drift in the order of +/−10-15% for a temperature range from −40 deg C. to +150 deg C. For example, for a Smart MOS 8MV 45V NLD Power MOS with channel width of 750 um and 294 parallel gates, the main FET (i.e. power switching device 110) comprises a geometry of 1.25×0.78 mm. The sense FET (i.e. sense switching device 120) geometries may be chosen to achieve a recopy ratio of 1:147. However when parasitic source and drain routing resistance of the Main FET are taken into account, the actual recopy ratio may be in the range of 1:77 to 1:87 for a temperature range from −40 deg C. to +150 deg C., which represents +/−12% temperature drift.

Monolithic power switches with current reporting functionality face a similar challenge in relation to sensing the load current with a 2% accuracy across all conditions. Any product that requires accurate sensing of the current through a power switching device for diagnostic or reporting purposes may face the same challenge of compensating for the temperature coefficient of the recopy ratio.

SUMMARY OF THE INVENTION

The present invention provides a switching module as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
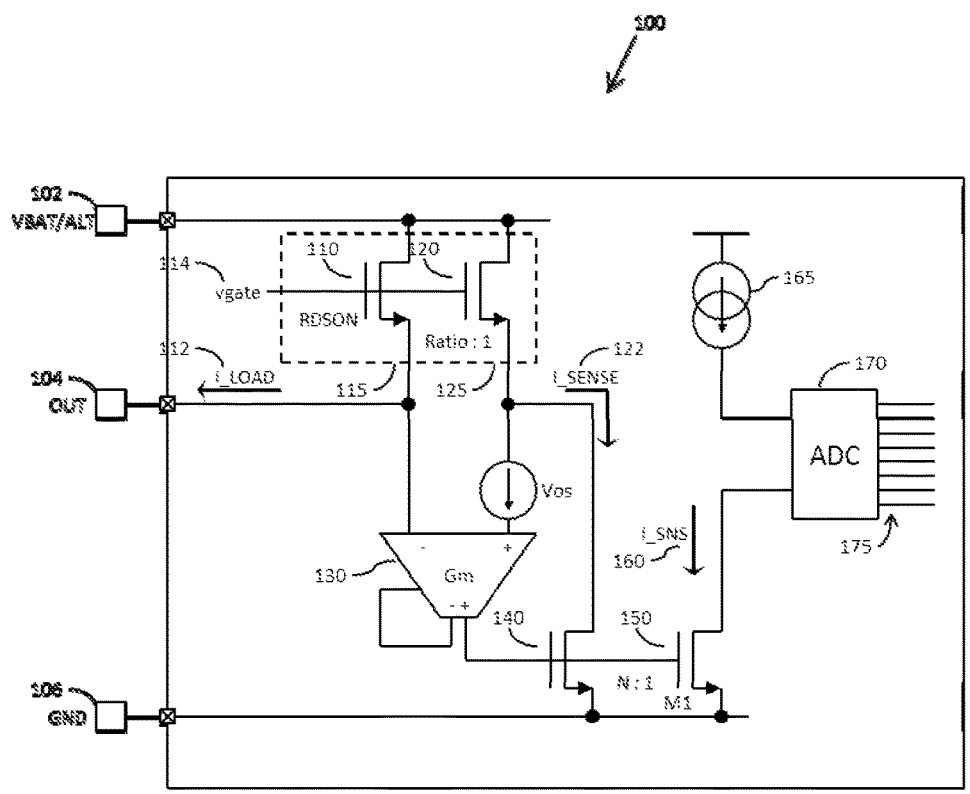
FIG. 1 illustrates a simplified circuit diagram of an example of a switching module.

Example embodiments of the present invention will now be described with reference to the accompanying drawings in which there are illustrated examples of switching modules comprising power current sense components arranged to generate sense currents representative of load currents output by power switching devices of the switching modules. However, it will be appreciated that the present invention is not limited to the specific examples herein described and as illustrated in the accompanying drawings. Specifically, the example embodiments illustrated in the accompanying drawings comprise N type field effect transistor (FET) based switching circuits and current sense components comprising amplifier and FET-based measurement loop and controlled current sources. However, it will be appreciated that the present invention is not limited to such N type FET based circuits or specific measurement loop with amplifier and FET-based controlled current source. For example, it is contemplated that P type FET based circuits may equally be used. It is further contemplated that the present invention may equally be applied to switching modules comprising current sense components comprising measurement loops external or internal to the integrated circuit device packages of the switching modules, with FET-based or bipolar junction transistor (BJT) based current sources, with power and sense switching FET devices operably coupled between a battery/supply and an output of the power switching module or operably coupled between an output of the power switching module and a ground. It is still further contemplated that that the present invention may equally be implemented in relation to N type FET based circuits with source terminals connected to ground and output connected to drain terminals.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

According to some examples of a first aspect of the present invention, there is provided a switching module comprising at least one power switching device arranged to output from an output node thereof a load current for the switching module, and at least one current sense component arranged to generate at least one sense current representative of the load current. The at least one current sense component comprises at least one temperature coefficient compensation resistance within the path of the at least one sense current and arranged to cause the at least one sense current to be at least partly compensated for a temperature coefficient caused by at least one parasitic routing resistance of a load current path for the at least one power switching device.

In this manner, the effect of temperature variations within the parasitic routing resistance of the load current path for the power switching device may be compensated for by a corresponding effect within the temperature coefficient compensation resistance, as described in greater detail below.

In some alternative examples, the at least one temperature coefficient compensation resistance may be arranged to comprise a resistance, Rmet_cmp, equal to a target load:sense ratio, RATIO, times higher than the at least one parasitic routing resistance, Rmet_main, for the load current path of the at least one power switching device, such that: Rmet_cmp=Rmet_main*RATIO.

In some alternative examples, the at least one temperature coefficient compensation resistance may be arranged to comprise a resistance, Rmet_cmp, equal to a target load:sense ratio, RATIO, times higher than the at least one parasitic routing resistance, Rmet_main, for the load current path of the at least one power switching device, less a parasitic routing resistance, Rmet_sense, for the path of the at least one sense current, such that: Rmet_cmp=(Rmet_main*RATIO)−Rmet_sense.

In some alternative examples, the at least one temperature coefficient compensation resistance may comprise at least one metal resistor element within the path of the at least one sense current.

In some alternative examples, the at least one current sense component may comprise at least one current sense device arranged such that a current flow through the at least one current sense device is proportional to the load current through the at least one power switching device, the current flow through the at least one current sense device comprising the at least one sense current.

In some alternative examples, the at least one power switching device and the at least one current sense device may each comprise a field effect transistor, FET, device.

In some alternative examples, the switching module may comprise at least one differential amplifier comprising differential inputs arranged to be operably coupled to a source node of the at least one power switching device and a source node of the at least one current sense device, and an output arranged to output a signal representative of the sense current flowing through the at least one current sense device.

In some alternative examples, the temperature coefficient compensation resistance may comprise a plurality of tap points via which the at least one differential amplifier may be selectively coupled to a source node of the at least one current sense device.

In some alternative examples, the switching module may be arranged to output at least one current sense signal based at least partly on the at least one sense current.

In some alternative examples, the switching module may comprise at least one digital to analogue converter arranged to output at least one digital code for the value of the load current based at least partly on the sense current.

In some alternative examples, the switching module may be arranged to generate at least one current sense signal comprising a current representative of the load current, the current sense signal being generated based at least partly on the sense current.

In some alternative examples, the switching module may be implemented within an integrated circuit device comprising at least one die within a single integrated circuit package.

Figure 2:
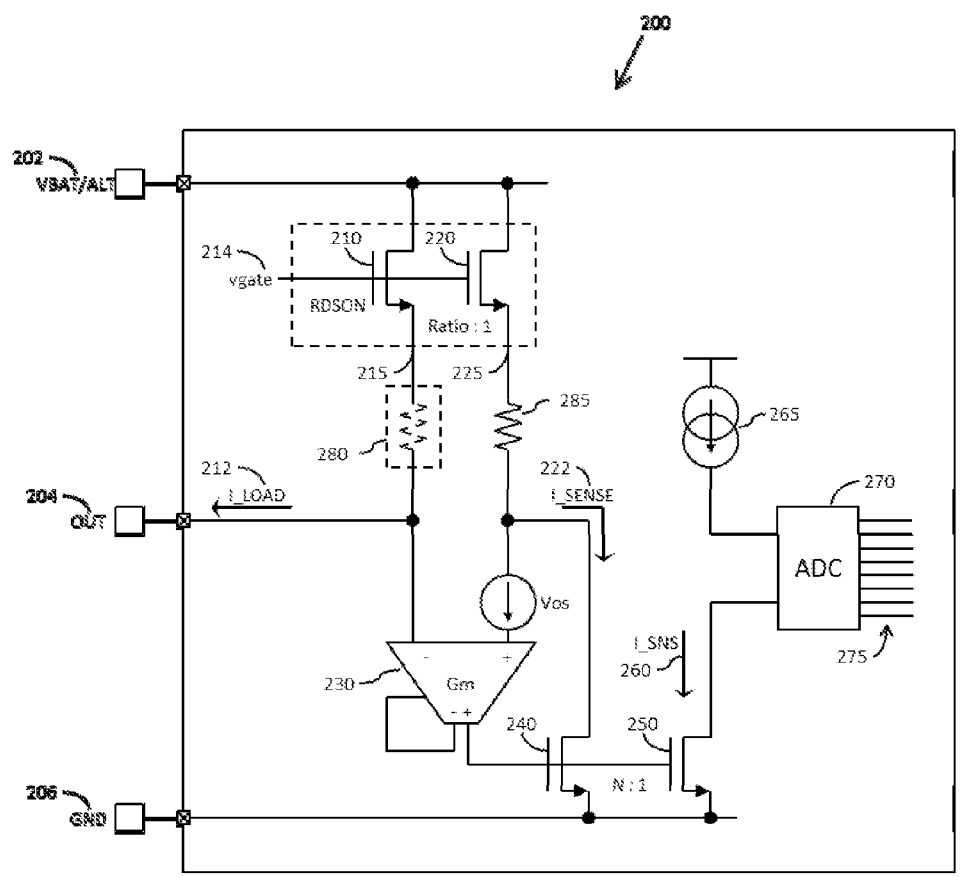
FIG. 2 illustrates a simplified circuit diagram of a further alternative example of a switching module.

Referring now to FIG. 2 there is illustrated a simplified circuit diagram of an example of a power switching module 200, such as a smart power switch. The power switching module 200 may be implemented within an integrated circuit device 201 comprising at least one die within a single integrated circuit package, and comprises a power switching device 210, which in the illustrated example comprises an N type field effect transistor (FET), operably coupled between a power supply 202 and an output 204 of the power switching module 200. In the example illustrated in FIG. 2, the power switching module 200 is for use within, for example, an alternator regulator. As such, the power supply 202 comprises a battery/alternator supply. The power switching device 210 is controllable via a gate signal 214 to allow a load current (I_LOAD) 212 to flow there through, from the battery/alternator supply 202 to the output 204 of the power switching module 200.

The power switching module 200 further comprises a current sense component for the load current (I_LOAD) 212. In the illustrated example, the current sense component comprises a differential or error amplifier 230 comprising a first (inverting) input operably coupled to a source node 215 of the power switching device 210. In this manner, the first (inverse) input of the differential amplifier 230 is arranged to receive a voltage signal representative of the voltage level of the battery/alternator supply 202 less the potential difference across the power switching device 210.

The differential amplifier 230 further comprises a second (non-inverting) input arranged to receive a current sense feedback signal generated by a current sense feedback component of the current sense component. The current sense feedback component comprises a sense switching device 220, which in the illustrated example comprises an N type FET, operably coupled between the battery/alternator supply 202 and a ground plane 206. The sense switching device 220 is controllable by the same gate signal 214 as the power switching device 210. In this manner, the current flow through the sense switching device 220 is arranged to be proportional to the current flow through the power switching device 210. A source node 225 of the sense switching device 220 is operably coupled to the second (non-inverting) input of the differential amplifier 230. In this manner, the second (non-inverting) input of the differential amplifier 230 is arranged to receive a voltage signal representative of the voltage level of the battery/alternator supply 202 less the potential difference across the sense switching device 220.

A feedback transistor 240 is operably coupled between the source node 225 of the sense switching device 220 and the ground plane 206. A gate of the feedback transistor 240 is operably coupled to a (positive) output of the differential amplifier 230. In this manner, the sense switching device 220 and the feedback transistor 240 are operably coupled in series, with the sense switching device 220 being controllable via the gate signal 214 and the feedback transistor 240 being controllable via the output of the differential amplifier 230. The differential amplifier 230 is arranged to control the current I_SENSE 222 through the feedback transistor 240 such that substantially equal voltage potentials are maintained at its inputs, and thus at the source nodes 215, 225 of the power switching device 210 and sense switching device 220.

Significantly, by maintaining substantially equal voltage potentials at the source nodes 215, 225 of the power switching device 210 and sense switching device 220, and because the sense switching device 220 is controlled by the same gate signal 214 as the power switching device 210, the current I_SENSE 222 is proportional to the load current (I_LOAD) 212. The feedback transistor 240 effectively acts as a voltage to current converter, converting the voltage signal output by the differential amplifier 230 into the current I_SENSE 222. As such, the voltage signal output by the differential amplifier 230 may be considered as being representative of the load current (I_LOAD) 212.

In the illustrated example, the output of the error amplifier 230 is further provided to a gate of a voltage-to-current converter transistor 250, which converts the output signal of the error amplifier 230 into a sense current I_SNS 260 representative of the current I_SENSE 222. In the illustrated example, the sense current I_SNS 260 is sourced from an input of an analogue to digital converter (ADC) 270. The ADC 270 in the illustrated example also receives a reference current 265 and outputs a digital code 275 based on the sense current I_SNS 260 and the reference current 265. For example, the ADC 270 may be arranged to output a digital code 275 based on an integer representative of the ratio of the sense current I_SNS 260 and the reference current 265.

In order to provide accurate sensing of the current through the power switching device 210 for diagnostic or reporting purposes, it is necessary to compensate for the temperature coefficient of the load:sense current ratio between the power switching device 210 and the sense switching device 220.

The load:sense current ratio between the power switching device 210 and the sense switching device 220 is primarily dependent on the ratio of the geometries of the two devices. However, parasitic metal on-resistances of the routing for the source and drain nodes of the power switching device 210 can be another significant contributing factor to the load:sense current ratio between the power switching device 210 and the sense switching device 220. Specifically, parasitic metal on-resistance(s) of the routing for the source and drain nodes of the power switching device 210, which provide the load current path for the power switching device 210, affect the absolute value of the load:sense current ratio and also create a significant temperature coefficient for the load:sense current ratio. Such parasitic metal on-resistance (s) of the routing for the source and drain nodes of the power switching device 210 have been indicated collectively at 280 in FIG. 2 for simplicity. Notably, the load current (I_LOAD) 212 is induced externally and thus is minimally affected by the parasitic routing resistance 280 of the load current path within the power switching module 200. However, the temperature coefficient for the load:sense current ratio created by the parasitic routing resistance 280 of the load current path is conveyed to the current I_SENSE 222, thereby affecting the accuracy with which the current I_SENSE 222 is proportional to the load current (I_LOAD) 212.

In some examples of the present invention, it is proposed to provide at least one temperature coefficient compensation resistance, indicated generally as 285, within the path of the sense current I_SENSE 222, the temperature coefficient compensation resistance(s) being arranged to cause the current I_SENSE 222 to be (at least partly) compensated for the temperature coefficient caused by the parasitic routing resistance 280 of the load current path for the power switching device 110. In this manner, the effect of temperature variations within the parasitic routing resistance 280 of the load current path for the power switching device 110 may be compensated for by a corresponding effect within the temperature coefficient compensation resistance, as described in greater detail below.

The load:sense current ratio is equal to the ratio of total resistances in the load current path and the sense current path, including resistances of metal routing. Neglecting $2^{nd}$ order temperature coefficients for simplicity, the load:sense current ratio may be defined as:

$$\text{Ratio} = \frac{\begin{bmatrix} RDson\_sens*(1+TCfet*dT)+ \\ Rmet\_sens*(1+TCmet*dT) \end{bmatrix}}{\begin{bmatrix} RDson\_main*(1+TCfet*dT)+ \\ Rmet\_main*(1+TCmet*dT) \end{bmatrix}} \quad \text{[Equation 1]}$$

where:
RDson_sens represents the Drain-Source ON resistance of the sense switching device 220 operated in linear mode;
RDson_main represents the Drain-Source ON resistance of the main (power) switching device 210 operated in linear mode;
TCfet represents the temperature coefficient for the main (power) switching device 210;
TCmet represents the temperature coefficient for the metal routing for the source and drain nodes of the main (power) switching device 210;
Rmet_sens represents the resistance of the metal routing for the source and drain nodes of the sense switching device 220; and
Rmet_main represents the resistance of the metal routing for the source and drain nodes of the main (power) switching device 210.

To get the load:sense current ratio constant over temperature, the RDson and Rmet parameters need to scale. If RDson_sens/RDson_main==Rmet_sens/Rmet_main, then the load:sense current ratio is constant. RDson is inversely proportional to the channel width W of the respective device (FET). Accordingly, to achieve a constant load:sense current ratio over temperature, the following must be true:

$$Rmet\_sens=Rmet\_main*(Wmain/Wsens)$$
$$=Rmet\_main*RATIO \quad \text{[Equation 2]}$$

where:
Wmain represents the channel width of the main (power) switching device 210;
Wsens represents the channel width of the sense switching device 220; and
RATIO represents the desired load:sense current ratio.

Thus, by providing the temperature coefficient compensation resistance(s) 285 within the path of the sense current I_SENSE 222, such that the temperature coefficient compensation resistance(s) 285 forms a part of the metal routing for the source and drain nodes of the sense switching device 220, the resistance of the metal routing for the source and drain nodes of the sense switching device 220 may be arranged such that Equation 2 above is true.

For example, the temperature coefficient compensation resistance(s) 285 may be arranged to comprise a resistance, Rmet_cmp, equal to a target load:sense ratio, RATIO, times higher than the parasitic routing resistance 280, Rmet_main, of the load current path for the power switching device 110, such that:

$$Rmet\_cmp=Rmet\_main*RATIO \quad \text{[Equation 3]}$$

In this manner, assuming negligible parasitic routing resistance for the sense current path of the sense switching device 220 other than temperature coefficient compensation resistance(s) 285:

$$Rmet\_sens=Rmet\_cmp=Rmet\_main*RATIO \quad \text{[Equation 4]}$$

Where the parasitic routing resistance (not shown) for the sense current path of the sense switching device 220 is not negligible, the temperature coefficient compensation resistance(s) 285 may be arranged such that the combined resistance, Rmet_sens, of the temperature coefficient compensation resistance(s) 285, Rmet_cmp, and the parasitic routing resistance (not shown), Rmet_sens_para, for the sense current path of the sense switching device 220 is equal to the parasitic routing resistance 280, Rmet_main, for the load current path of the power switching device 210 times the target load:sense ratio, RATIO, such that:

$$Rmet\_sens=Rmet\_cmp+$$
$$Rmet\_sens\_para=Rmet\_main*RATIO \quad \text{[Equation 5]}$$

Accordingly, the temperature coefficient compensation resistance(s) 285, Rmet_cmp, may be arranged to comprise a resistance equal to the target load:sense ratio, RATIO, times higher than the parasitic routing resistance 280, Rmet_main, for the load current path of the power switching device 210, less the parasitic routing resistance, Rmet_sens_para, for the sense current path of the sense switching device 220, such that:

$$Rmet\_cmp=(Rmet\_main*RATIO)-Rmet\_sens\_para \quad \text{[Equation 6]}$$

In some examples, the temperature coefficient compensation resistance(s) 285 may comprise(s) one or more metal resistor elements within the path of the sense current I_SENSE 222. In the example illustrated in FIG. 2, a single temperature coefficient compensation resistance 285 has been illustrated. However, it will be appreciated that such a temperature coefficient compensation resistance 285 may be implemented using any number of suitable elements, in series or in parallel, within the path of the sense current I_SENSE 222. Furthermore, although the temperature coefficient compensation resistance 285 has been illustrated as being provided adjacent the source node 225 of the sense switching device 220, it is contemplated that the temperature coefficient compensation resistance 285 may additionally/alternatively be implemented adjacent the drain node of the sense switching device 220, such as illustrated at 325 in FIG. 3.

As will be appreciated by a skilled artisan, the distributed nature of source/drain routing resistance (especially in lateral devices) makes it difficult (if at all possible) to implement accurate and reliable compensation using techniques that require compensation elements to be connected as close as possible to the source node(s) of the main (power) and/or sense FET devices 210, 220.

Advantageously, the implementation of a temperature coefficient compensation resistance 285 within the path of the sense current 222, as herein described, enables the effect of temperature variations within the parasitic routing resistance 280 of the load current path for the power switching device 210 to be accurately and reliably compensated for by a corresponding effect within the temperature coefficient compensation resistance 285, even when such a temperature coefficient compensation resistance 285 is not connected especially close to the soured node of the sense FET device 220.

In some examples, it is contemplated that the current sense component may be capable of being calibrated, for example to take into consideration process corner variations, etc. within different switching module devices. For example, and as illustrated in FIG. 4, a temperature coefficient compensation resistance 485 may comprise a plurality of tap points via which the differential amplifier 230 may be selectively coupled to the source node 225 of the current sense FET device 220.

Figure 3:
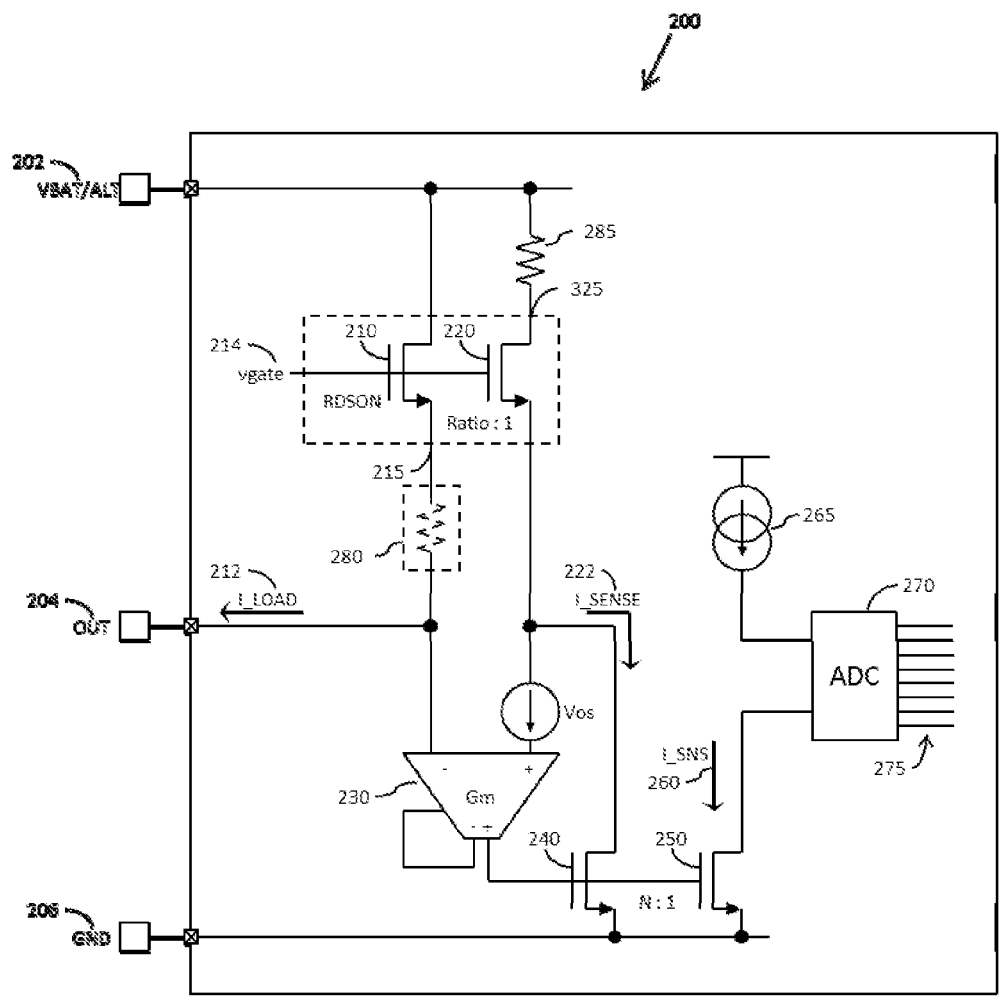
FIG. 3 illustrates a simplified circuit diagram of a still further alternative example of a switching module.
Figure 4:
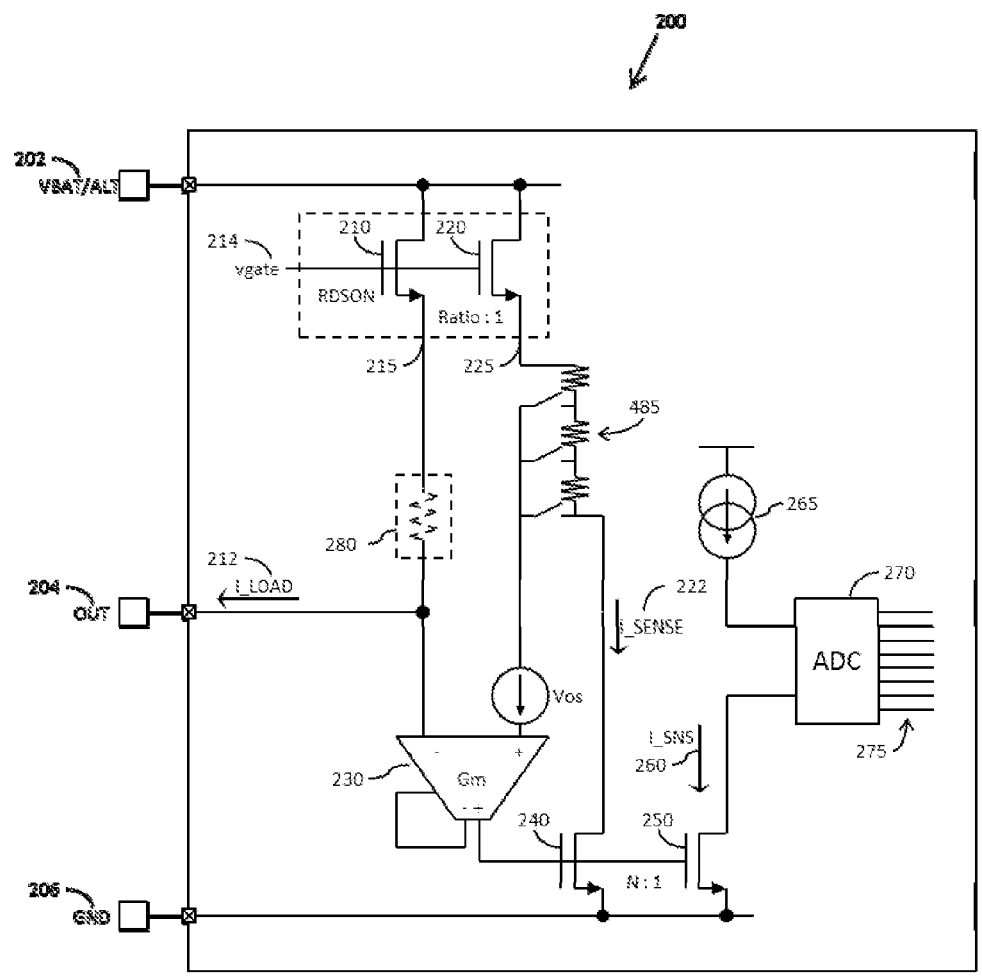
FIG. 4 illustrates a simplified circuit diagram of a still further alternative example of a switching module.

In the examples illustrated in FIGS. 2 to 4, the output of the error amplifier 230 is provided to a gate of a voltage-to-current converter transistor 250, which converts the output signal of the error amplifier 230 into a sense current I_SNS 260 representative of the current I_SENSE 222. The sense current I_SNS 260 is sourced from an analogue to digital converter (ADC) 270 which outputs a digital code 275 based on an integer representative of the ratio of the sense current I_SNS 260 and a reference current 265.

Figure 5:
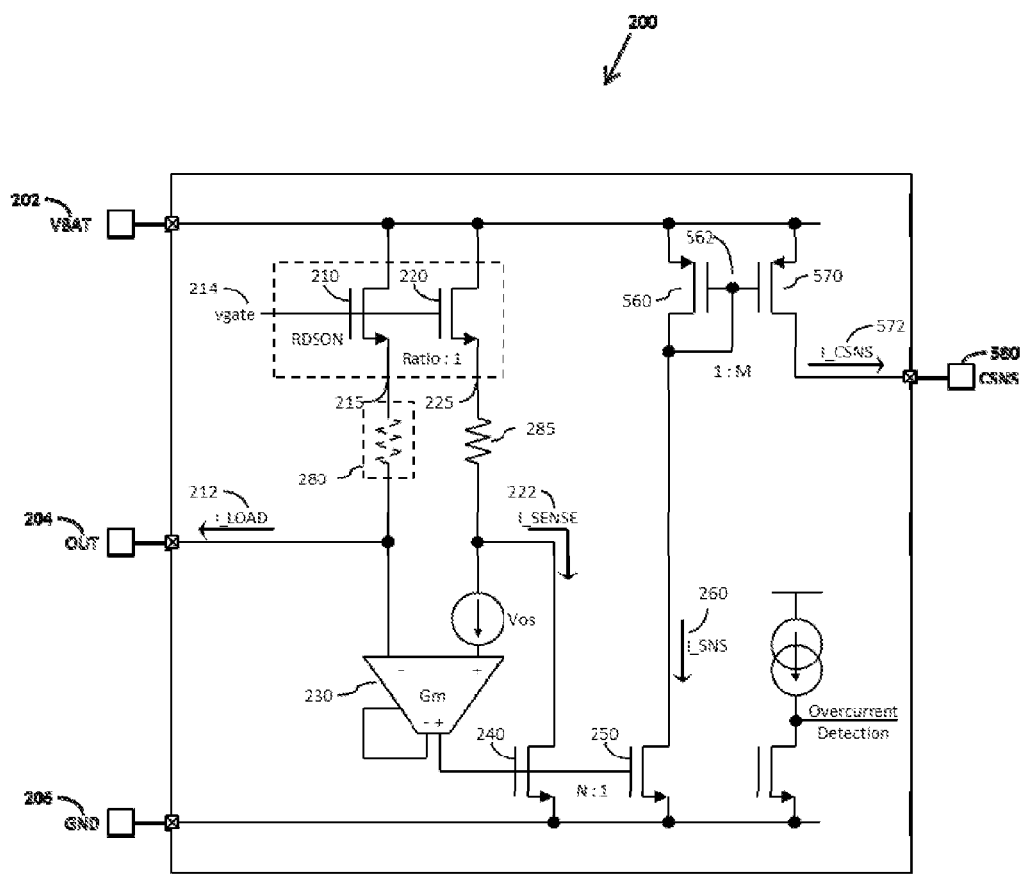
FIG. 5 illustrates a simplified circuit diagram of a still further alternative example of a switching module.

In some alternative examples, the switching module 200 may be arranged to generate current sense signal comprising a current representative of the load current (I_LOAD) 112. For example, and as illustrated in FIG. 5, the switching module 200 may comprise a current-to-voltage converter transistor 560, operably coupled in series with the voltage-to-current converter transistor 250, and arranged to convert the sense current I_SNS 260 to a voltage signal 562 at its gate terminal. A further voltage-to-current converter transistor 570, which has its gate terminal operably coupled to the gate terminal of the current-to-voltage converter transistor 560, converts the voltage signal 562 into an output sense current I_CSNS 572 which may then be output through a current sense terminal (CSNS) 580.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device as illustrated in the accompanying drawings. Alternatively, the examples may be implemented as any number of separate integrated circuits or separate devices interconnected with each other in a suitable manner. For example, the differential amplifier 230 and/or other elements of the current sense component may be implemented external to the IC device 205 comprising the power switching device 210, for example within a separated integrated circuit device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A switching module comprising:
   a power switching device arranged to output from an output node thereof a load current for the switching module; and a current sense component arranged to generate a sense current representative of the load current, the a current sense component comprising:
a temperature coefficient compensation resistance within a path of the sense current and arranged to cause the sense current to be at least partly compensated for a temperature coefficient caused by a parasitic routing resistance of a load current path for the power switching device, wherein the temperature coefficient compensation resistance is based on a plurality of resistors that combine to comprise a plurality of tap points via which a differential amplifier may be selectively coupled to a source node of the current sense device.

2. The switching module of claim 1, wherein the temperature coefficient compensation resistance is arranged to comprise a resistance, Rmet_cmp, equal to a target load:sense ratio, RATIO, times higher than the parasitic routing resistance, Rmet_main, for the load current path of the power switching device, such that:

$$R\text{met\_cmp} = R\text{met\_main} * \text{RATIO}.$$

3. The switching module of claim 2, wherein the parasitic routing resistance comprises a metal resistor element within the path of the sense current.

4. The switching module of claim 1, wherein the temperature coefficient compensation resistance is arranged to comprise a resistance, Rmet_cmp, equal to a target load:sense ratio, RATIO, times higher than the parasitic routing resistance, Rmet_main, for the load current path of the power switching device, less a parasitic routing resistance, Rmet_sense, for the path of the sense current, such that:

$$R\text{met\_cmp} = (R\text{met\_main} * \text{RATIO}) - R\text{met\_sense}.$$

5. The switching module of claim 4, wherein the parasitic routing resistance comprises a metal resistor element within the path of the sense current.

6. The switching module of claim 1, wherein the parasitic routing resistance comprises a metal resistor element within the path of the sense current.

7. The switching module of claim 1, wherein the current sense component comprises a current sense device arranged such that a current flow through the current sense device is proportional to the load current through the power switching device, the current flow through the current sense device comprising the sense current.

8. The switching module of claim 7, wherein the power switching device and the current sense device each comprises a field effect transistor, FET, device.

9. The switching module of claim 1, wherein the switching module is arranged to output a current sense signal based at least partly on the sense current.

10. The switching module of claim 9, wherein the switching module comprises a digital to analogue converter arranged to output a digital code for the value of the load current based at least partly on the sense current.

11. The switching module of claim 9, wherein the switching module is arranged to generate a current sense signal comprising a current representative of the load current, the current sense signal being generated based at least partly on the sense current.

12. The switching module of claim 1 implemented within an integrated circuit device comprising a die within a single integrated circuit package.

13. A method comprising:
outputting, from an output node of a power switching device of a switching module, a load current for the switching module, and
generating, by a current sense component, a sense current representative of the load current; the current sense component comprising:
partly compensating, by a temperature coefficient compensation resistance within a path of a sense current, the sense current for a temperature coefficient caused by a parasitic routing resistance of a load current path for the power switching device, wherein the temperature coefficient compensation resistance is based on a plurality of resistors that combine to comprise a plurality of tap points via which a differential amplifier may be selectively coupled to a source node of a current sense device of the current sense component.

14. The method of claim 13, wherein the parasitic routing resistance comprises a metal resistor element within the path of the sense current.

15. The method of claim 13, further comprising:
providing, by a current sense device of the current sense component, a current flow through the current sense device that is proportional to the load current through the power switching device, wherein the current flow through the current sense device includes the sense current.

16. The method of claim 15, wherein the power switching device and the current sense device each comprises a field effect transistor, FET, device.

17. The method of claim 13, further comprising:
outputting, by the switching module, a current sense signal based at least partly on the sense current.

18. A switching module comprising:
a power switching device arranged to output from an output node thereof a load current for the switching module;
a differential amplifier comprising:
differential inputs arranged to be operably coupled to a source node of the power switching device, and an output arranged to output a signal representative of the sense current flowing through the current sense device; and
a current sense component arranged to generate a sense current representative of the load current, the current sense component comprising:
a current sense device including a source node operably coupled to the differential inputs of the differential amplifier; and
a temperature coefficient compensation resistance within the path of the sense current and arranged to cause the sense current to be at least partly compensated for a temperature coefficient caused by a parasitic routing resistance of a load current path for the power switching device, wherein the temperature coefficient compensation resistance is based on a plurality of resistors that combine to comprise a plurality of tap points via which a differential amplifier may be selectively coupled to a source node of a current sense device of the current sense component.

* * * * *